Figure 1:
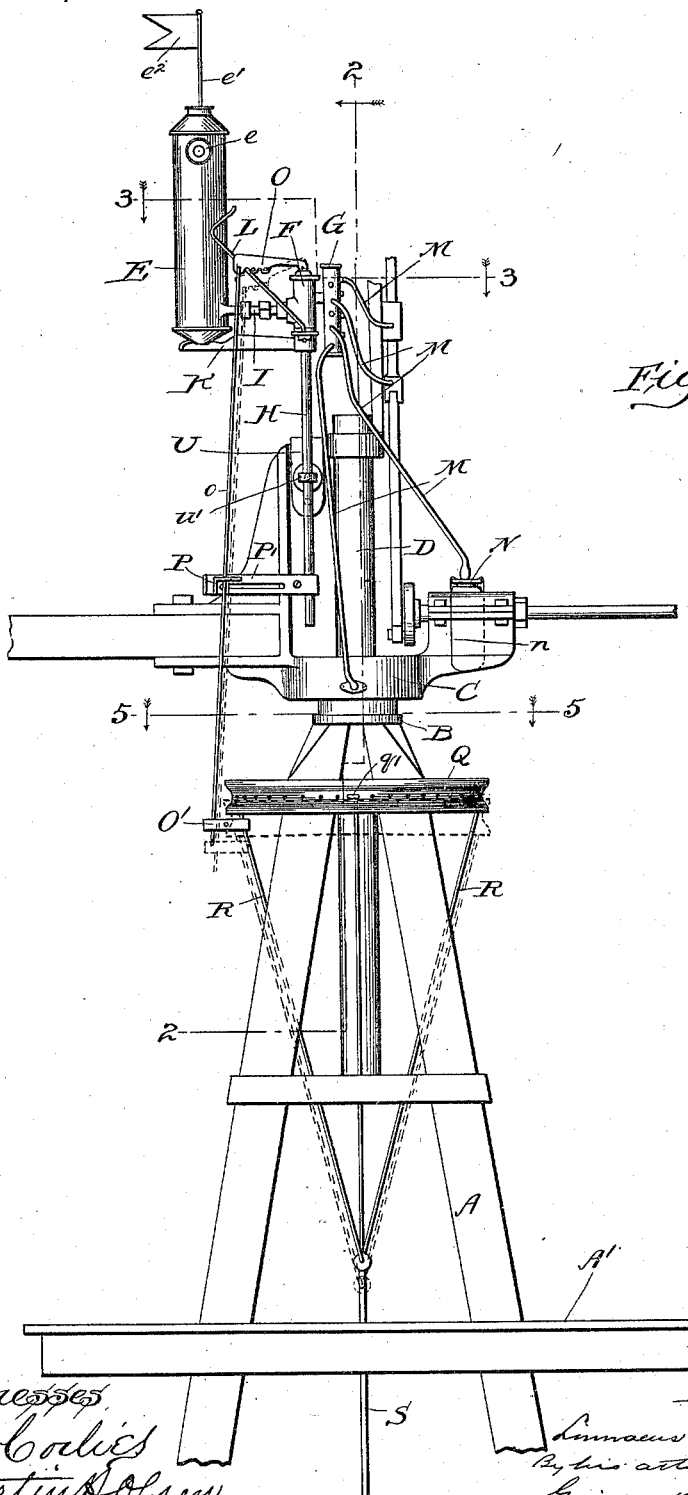

(No Model.) 3 Sheets—Sheet 1.

L. C. POND.
LUBRICATOR.

No. 579,008. Patented Mar. 16, 1897.

Witnesses
W. C. Colies
Martin H. Olsen

Inventor
Linnaeus C. Pond
By his attorneys
Grosey & Hopkins

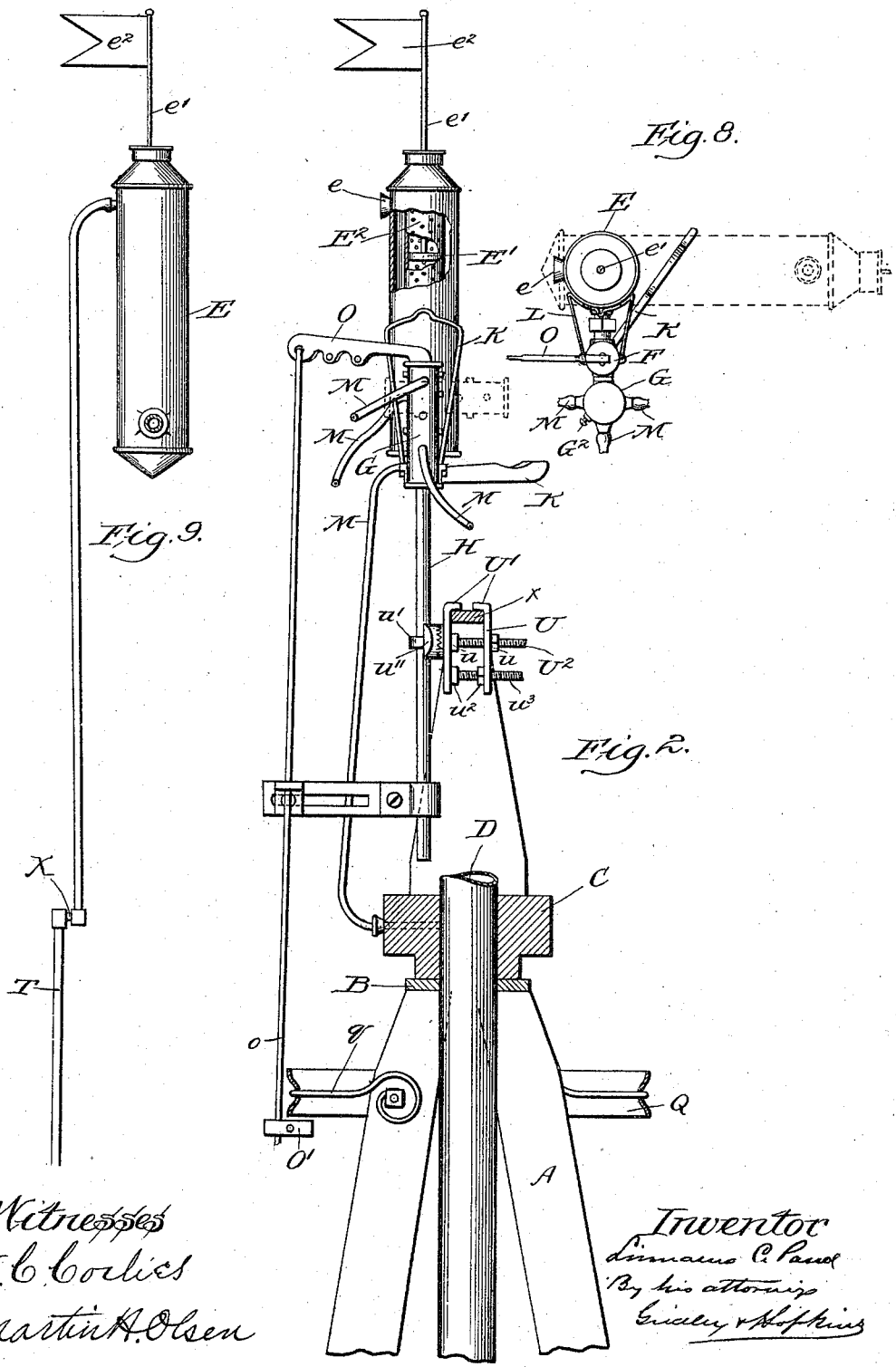

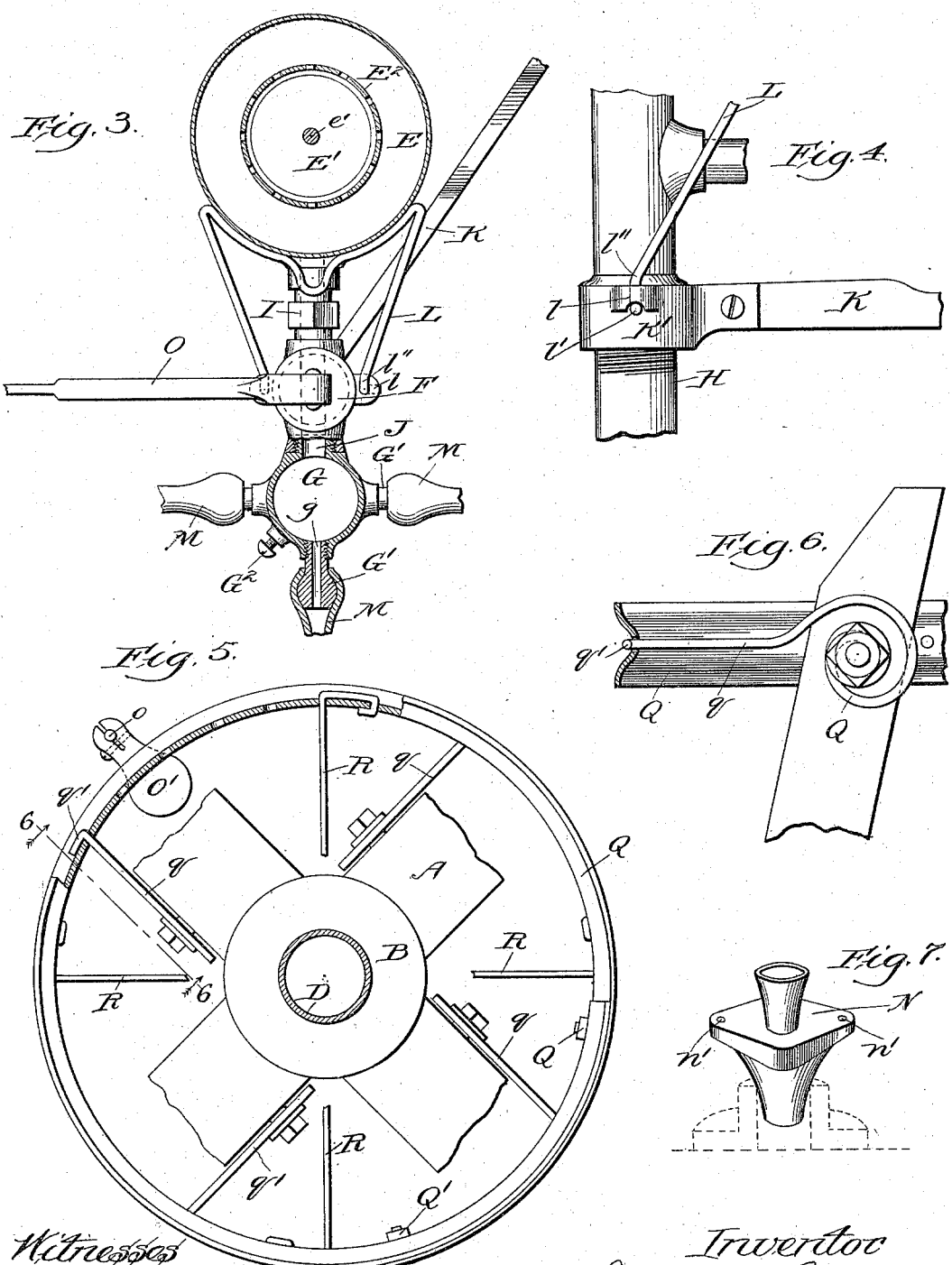

ature, you
UNITED STATES PATENT OFFICE.

LINNAEUS C. POND, OF BELMOND, IOWA.

LUBRICATOR.

SPECIFICATION forming part of Letters Patent No. 579,008, dated March 16, 1897.

Application filed July 17, 1896. Serial No. 599,471. (No model.)

*To all whom it may concern:*

Be it known that I, LINNAEUS C. POND, a citizen of the United States, residing at Belmond, in the county of Wright and State of Iowa, have invented certain new and useful Improvements in Lubricators for Windmills, of which the following is a specification.

The object of the present invention is to provide a device by which all the bearings of a windmill may be lubricated from time to time without the necessity of climbing the tower and lubricating each bearing separately. This object I accomplish by the use of a reservoir, a valve for controlling the flow of the oil therefrom, a distributer to which the oil flows from the valve, and a number of pipes or tubes all leading from the distributer, one to each of the bearings to be lubricated, the reservoir, the valve, and the distributer being located at a point above the highest bearing and all the parts being carried by the revoluble head of the mill, suitable means being provided for operating the valve from the ground.

The invention consists in the features of novelty that are particularly pointed out in the claims hereinafter, and in order that it may be fully understood I will describe it with reference to the accompanying drawings, which are made a part of this specification, and in which—

Figure 1 is an elevation of a lubricator embodying the invention and of so much of the upper portion of a windmill as is necessary in order to illustrate its application thereto. Fig. 2 is a sectional elevation, on a somewhat larger scale, of a lubricator embodying the invention and of a portion of the upper part of a windmill, the plane of the section being indicated by the line 2 2, Fig. 1, and the parts being viewed in the direction of the arrow. Fig. 3 is a horizontal section, on a somewhat larger scale, of a lubricator embodying the invention, the plane of the section being indicated by the line 3 3, Fig. 1. Fig. 4 is an enlarged detail view. Fig. 5 is an enlarged horizontal section on the line 5 5, Fig. 1. Fig. 6 is an enlarged section on the line 6 6, Fig. 5. Fig. 7 is an enlarged detail view. Fig. 8 is a plan view of the reservoir, the valve, the distributer, and their accessories. Fig. 9 is an elevation of the reservoir and of a portion of a tube by which it may be filled from the ground.

A represents a portion of a windmill-tower, which is surmounted by a wear-plate B, upon which the head C of the mill bears, said head being mounted to revolve about a king-post D, which is supported by the tower.

E represents the oil-reservoir, F the valve, and G the distributer, all supported by a stem H, which is suitably clamped or otherwise secured to the revoluble head of the mill, so as to be carried thereby. Preferably the valve-casing is permanently united to the stem H, and the reservoir and distributer are connected to the valve-casing by means which will permit them to be moved from vertical to horizontal positions when desired.

As shown in the drawings, the connection between the reservoir and valve-casing consists of a union I, screwed at its opposite ends into threaded sockets of the reservoir and casing, respectively; and the connection between the casing and distributer consists of an externally-screw-threaded hollow stub J, which is screwed into a threaded socket in the casing, the nature of these connections being such that for filling the reservoir it may be thrown down to the position indicated by dotted lines in Fig. 8, and for a purpose that is hereinafter explained the distributer may be thrown down to the horizontal position indicated by dotted lines in Fig. 2. When the reservoir is in horizontal position, it is supported by an arm K, proceeding from a collar K' on the stem H, and when in vertical position it is held by a spring L, which is bent at its middle so as to embrace the reservoir, as shown more clearly in Fig. 3. The spring is formed of a piece of wire doubled upon itself, and has its ends secured to ears *l*, formed on the collar K', from which the arm K proceeds. In order to secure the spring to these ears, the ears are perforated for receiving the ends of the spring, and below the ears the ends are bent at right angles, as shown at *l'*, in order to prevent their withdrawal, slight bends *l''* above the ears being sufficient to prevent the ends of the spring from being displaced downward.

The distributer is provided with a number of discharge-openings g, located at different levels, into which, or at least into as many of which as there are bearings to be lubricated, are screwed nipples G', and onto these nipples are fitted the ends of pipes or tubes M, which convey the oil from the distributer to the bearings to be lubricated. These distributing-tubes are preferably made of lead, but may be of any other metal or of rubber. Preferably each of them is provided at its discharge end with a nozzle N, which is adapted to be inserted in the lubricating-opening of the bearing, as indicated in Fig. 7, and when so inserted the nozzle is secured in some suitable way. For example, it may be tied down by a wire n, as shown in Fig. 1, the nozzle being provided with perforations n' for receiving the wire. The nature of the valve F is such that it is held normally seated, so as to close the communication between the reservoir and distributer, by means of a spring, and for unseating it in order to allow oil to flow from the reservoir into the distributer its stem is connected with a lever O, from which a suitable connection extends to the ground for operating it. This connection preferably consists of a rod o, connected at its upper end to the lever, whence it proceeds downward through a guide P, and carries near its lower end a tappet O', which is arranged beneath a ring Q, this ring being supported by the tower A through the medium of a plurality of spring-arms q. Each of these spring-arms is of involute form at its inner end, as shown at Fig. 6, and near its outer end passes through a perforation in the ring and is bent so that its outer extremity q' bears against the outside of the ring.

R represents a number of wires the upper ends of which are secured to the ring Q by being passed through its perforations and bent, as shown in Fig. 5, and the lower ends of which are connected to a wire or rod or cord S, which extends within reach of the person on the ground. The ring Q is provided in its periphery with a circumferential groove in which the bent extremities of the springs q and wires R are received, to the end that they may not interfere in any way with the rod o. The ring is made of sheet metal, and in order to make it adjustable in circumference, to the end that it may be used on towers of different cross-sectional dimensions, it is open, its ends being overlapped and secured together by bolts Q' passing through its perforations, and in order to enable the position of the rod o to be adjusted with relation to the ring, to the end that normally it shall be out of contact therewith, the guide P is adjustably secured to an arm P', proceeding from the stem H. By pulling down upon the connection S the ring Q is drawn down and, coming in contact with the tappet O', draws down the rod o and lever O, thereby unseating the valve and permitting oil to flow from the reservoir and fill the distributer, from which the oil is distributed through the tubes M to all of the bearings. By reason of the fact that the discharge-openings of the distributer are located at different levels, so that the receding surface of the lubricant passes them in succession, whereby the supply of lubricant is cut off from them in succession, the quantity of oil escaping through them varies in proportion to their elevation, and the object of this is to supply each of the bearings with just the quantity which it requires. The tube for supplying the largest bearing or the one requiring the greatest quantity of oil is connected with the lowest nipple of the distributer, the tube for supplying the smallest bearing or the one requiring the least oil is connected with the highest nipple of the distributer, and in like manner the tubes of the other bearings are connected with the intermediate nipples. This graduated distribution of the oil may be accomplished by placing the distributer either in vertical position, as shown by full lines, or in horizontal position, as indicated by dotted lines.

I believe myself to be the first to lubricate a number of bearings requiring different quantities of oil and to supply each with the quantity of oil it requires by means of a distributer having discharge-openings located at different elevations and tubes or passages for conveying the oil therefrom to the several bearings, and I therefore desire to have it understood that in its broadest aspect the invention is not limited to a distributer of any particular character so long as it has the essential features herein described, to wit: the openings located at different elevations and tubes or passages for conveying the oil therefrom to the several bearings, regard being had to the quantity of oil each bearing requires in selecting the opening from which it is supplied.

I prefer to operate the valve from the ground through the medium of connections constructed as described, for the reason that they allow the free revolution of the head of the mill without in any way interfering with them; but I desire to have it understood that in its broadest aspect the invention is not limited thereto, and any other form of connection is within the scope of my invention. I prefer also to provide the reservoir with a filling-opening e, into which the oil is poured, the reservoir being placed in horizontal position, as indicated by dotted lines, in order to do so; but this is not essential, and, if desired, the reservoir may be filled from the ground by means of a pump connected with it through a tube T, formed in sections jointed at t, so as to permit a slight movement between them, it being the intention that the tube shall bear against the circular edge of the deck A' or against a ring supported by the tower, so that it may partake of the movement of the head of the mill, due to its revolution about the king-post, without coming in contact with the uprights of the tower. The arrangement first described is preferred, however, since it is the intention to use a reservoir of sufficient capacity to hold enough oil for a whole season.

In order to indicate the height of the oil in the reservoir, I use a float E', from which rises a stem $e'$, carrying a signal $e^2$, the float being guided and confined to a strictly vertical movement by a perforated tube $E^2$, located within the reservoir.

The invention is not limited to any particular means for securing the lubricator to the windmill-head. I prefer, however, to accomplish this by means of a clamp U. This clamp comprises two jaws U', through which passes a screw $U^2$, on which are turned two nuts $u$, one bearing against each of the jaws of the clamp, the end of the screw being provided with an eye $u'$, through which the stem H passes and in which it is clamped against a block or washer U'', which is provided with a serrated face engaging a correspondingly-serrated boss on one of the jaws of the clamp, and a spreading-screw $U^3$, which passes through one jaw of the clamp and bears at its end against the inner face of the other jaw and on which is turned a nut $u^2$, bearing against the inner face of the other jaw. With this arrangement by tightening the nuts $u$ $u^2$ the jaws of the clamp are closed together, and the stem H is firmly clamped between one side of the eye $u'$ and the block $u''$, the serrations of this block enabling the stem to be adjusted to any desired position with relation to the jaws.

So many of the discharge-openings of the distributer as are not needed in a given apparatus are closed by screw-plugs $G^2$.

Having thus described my invention, the following is what I claim as new therein and desire to secure by Letters Patent:

1. A lubricator having, in combination, a distributer provided with discharge-openings so located that the receding surface of the lubricant passes them in succession, whereby the supply of lubricant is cut off from them in succession, and a number of tubes or passages proceeding from said openings to the bearings to be lubricated, substantially as set forth.

2. In a lubricator, the combination of a reservoir, a distributer having a number of discharge-openings located at different levels, so that the receding surface of the lubricant passes them in succession, whereby the supply of lubricant is cut off from them in succession, tubes extending from said openings to the bearings to be lubricated, and means for intermittently charging the distributer with lubricant from the reservoir, substantially as set forth.

3. In a lubricator, the combination of a reservoir, a distributer having a number of discharge-openings located at different levels, so that the receding surface of the lubricant passes them in succession, whereby the supply of lubricant is cut off from them in succession, tubes extending from said openings to the bearings to be lubricated, and a valve for controlling the flow of oil from the reservoir to the distributer, substantially as set forth.

4. In a lubricator for windmills, the combination of a reservoir, a distributer having a number of discharge-openings located at different levels, a valve for controlling the flow of oil from the reservoir to the distributer, all of said parts being carried by the revoluble head of the mill, and means for operating the valve from the ground, substantially as set forth.

5. In a lubricator for windmills, the combination of a reservoir, means for conveying oil therefrom to the bearings to be lubricated, a valve for controlling the flow of oil from the reservoir, and means for operating the valve from the ground, said means including a depressible ring, spring-arms supporting the ring, and a connection extending from the valve and terminating below the ring and within reach thereof when depressed, substantially as set forth.

6. In a lubricator for windmills, the combination of a reservoir, a distributer having a plurality of discharge-openings located at different levels, tubes for conveying oil from said openings to the bearings to be lubricated, a valve for controlling the flow of oil from the reservoir to the distributer, and means for operating the valve from the ground, said means including a ring surrounding the tower, spring-arms proceeding from the tower and supporting the ring, and a connection extending from the valve and terminating below the ring and within reach thereof when depressed, substantially as set forth.

7. In a lubricator for windmills, the combination of a reservoir, means for conveying oil therefrom to the bearings to be lubricated, a valve for controlling the flow of oil from the reservoir, and means for operating the valve from the ground, said means including a depressible ring, a plurality of spring-arms connected at their outer ends to the ring and at their inner ends to the tower, a connection extending from the valve and terminating below the ring and in reach thereof when depressed, and a connection extending from the ring to the ground, substantially as set forth.

8. In a lubricator for windmills, the combination of a reservoir, means for conveying oil therefrom to the bearings to be lubricated, a valve for controlling the flow of oil from the reservoir, and a connection extending to the ground for operating said valve, said connection including a circumferentially-adjustable ring, spring-arms proceeding from the tower and supporting it, a rod proceeding downward from the valve and terminating at bottom within reach of the ring when depressed, and a guide through which said rod passes, said guide being adjustable for adjusting the position of the rod with relation to the ring, substantially as set forth.

9. In a lubricator for windmills, the combination with a reservoir and means for conveying oil therefrom to the bearings to be lubricated, said reservoir being movable from a vertical to a horizontal position, of a spring for holding the reservoir in vertical position, and a support upon which it bears when moved to horizontal position, substantially as set forth.

LINNAEUS C. POND.

Witnesses:
D. B. POND,
T. B. KAUFMAN.